(12) United States Patent
Kasuya (10) Patent No.: US 10,457,397 B1
(45) Date of Patent: Oct. 29, 2019

(54) AIRCRAFT SEAT STRUCTURE

(71) Applicant: JAMCO CORPORATION, Mitaka-shi, Tokyo (JP)

(72) Inventor: Toshihisa Kasuya, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 16/086,916

(22) PCT Filed: Apr. 1, 2016

(86) PCT No.: PCT/JP2016/060886
§ 371 (c)(1),
(2) Date: Sep. 20, 2018

(87) PCT Pub. No.: WO2017/168746
PCT Pub. Date: Oct. 5, 2017

(51) Int. Cl.
*B64D 11/06* (2006.01)
(52) U.S. Cl.
CPC ...... *B64D 11/0641* (2014.12); *B64D 11/0601* (2014.12); *B64D 11/0605* (2014.12); *B64D 11/0606* (2014.12)
(58) Field of Classification Search
CPC ............ B64D 11/0601; B64D 11/0605; B64D 11/0606; B64D 11/0641
See application file for complete search history.

(56) References Cited

U.S. PATENT DOCUMENTS 7,798,446 B2 * 9/2010 Park ..................... B60N 2/34
244/118.5

7,997,531 B2 * 8/2011 Bettell ................. B64D 11/064
244/118.6

(Continued)

FOREIGN PATENT DOCUMENTS

| JP | 2007-523002 A | 8/2007 |
|---|---|---|
| JP | 4747291 B2 | 8/2011 |
| JP | 4900832 B2 | 3/2012 |
| JP | 2014-511798 A | 5/2014 |
| JP | 2015-529593 A | 10/2015 |

OTHER PUBLICATIONS

International Search Report dated Jun. 28, 2016, issued in counterpart application No. PCT/JP2016/060886 , w/English translation (5 pages).

(Continued)

*Primary Examiner* — Philip J Bonzell
*Assistant Examiner* — Tye William Abell
(74) *Attorney, Agent, or Firm* — Westerman, Hattori, Daniels & Adrian, LLP (57) ABSTRACT

An aircraft seat structure comprises: a first seat unit comprising a seat region that includes a seat that can be changed between a seat configuration and a bed configuration, and a protruding region that protrudes adjacent to the seat region in a direction perpendicular to the longitudinal direction of the seat region, which are surrounded by a plurality of partition walls; and a second seat unit comprising a seat region that includes a seat that can be changed between a seat configuration and a bed configuration, wherein the protruding region of the first seat unit and the protruding region of the second seat unit are formed so as to protrude in opposite directions relative to each seat region, and the first seat unit and the second seat unit are arranged in such a manner that longitudinal directions thereof match a front-rear direction of the aircraft.

10 Claims, 10 Drawing Sheets

(56) References Cited

U.S. PATENT DOCUMENTS

| | | | | |
|---|---|---|---|---|
| 8,177,165 | B2 | 5/2012 | Bettell | |
| 2007/0170310 | A1* | 7/2007 | Bock | B64D 11/0604 |
| | | | | 244/118.5 |
| 2012/0223557 | A1* | 9/2012 | Henshaw | B64D 11/06 |
| | | | | 297/232 |
| 2013/0032668 | A1* | 2/2013 | Foucher | B64D 11/06 |
| | | | | 244/118.6 |
| 2014/0035330 | A1* | 2/2014 | Henshaw | B60N 3/002 |
| | | | | 297/174 R |
| 2016/0052633 | A1* | 2/2016 | Lawson | B64D 11/00 |
| | | | | 244/118.6 |
| 2016/0083094 | A1* | 3/2016 | Clucas | B64D 11/0636 |
| | | | | 244/118.6 |

OTHER PUBLICATIONS

Written Opinion dated Jun. 28, 2016, issued in counterpart application No. PCT/JP2016/060886 (4 pages).
Notification of Reasons for Refusal dated Aug. 1, 2017, issued in counterpart Japanese Patent Application No. 2016-551344, w/English translation (6 pages).
Notification of Reasons for Refusal dated Feb. 13, 2018, issued in counterpart Japanese Patent Application No. 2016-551344, w/English translation (4 pages).
Decision to Grant a Patent dated Aug. 14, 2018, issued in counterpart Japanese Patent Application No. 2016-551344, w/English translation (6 pages).

* cited by examiner

AIRCRAFT SEAT STRUCTURE

TECHNICAL FIELD

The present invention relates to an aircraft seat structure equipped in a passenger cabin of an aircraft.

BACKGROUND ART

Hitherto, for example, as seats for first class and business class cabins, seats provided in aircrafts are known to adopt a seat structure which can be changed selectively between a configuration in which a backrest is positioned upright for passengers to be seated and a configuration in which the backrest is reclined in a horizontal state to enable the seat to be used as a bed.

In many cases, these types of the seat structure are configured as a seat module, i.e., seat unit, in which a seat capable of being reclined is arranged in a space surrounded by wall-like partition members (refer, for example, to Japanese Patent Literatures 1 and 2).

CITATION LIST

Patent Literature

[PTL 1] Publication of Japanese Patent No. 4747291
[PTL 2] Publication of Japanese Patent No. 4900832

Non Patent Literature

SUMMARY OF INVENTION

Technical Problem

In the seat modules disclosed in Japanese Patent Literatures 1 and 2, by partitions, a wide space in a lateral direction is ensured at the backrest side, and a narrowed space in the lateral direction is ensured at a foot-side end of the seat module, to realize passenger comfort.

In this state, if it is considered that the passengers should face a direction toward which the aircraft is flying as much as possible, the seat modules must be arranged in straight rows, wherein as taught in Patent Literature 1, an accommodating portion may be formed, in which a foot-side end portion of the passenger seat module arranged on a following row is inserted to a part of a backrest side of the passenger seat module arranged on a preceding row thereof.

However, in this type of seat module, the passenger must lie down diagonally in a space that is approximately rectangular when viewed from above, so that not only the psychological comfort of the passenger is deteriorated but also the number of seat modules that can be arranged in the cabin is restricted and the capacity of passengers is reduced.

Meanwhile, as illustrated in Patent Literature 2, it may be possible to adopt a seat module that is approximately L-shaped in upper view and an area near a backrest of the seat is formed to have a wide width so that the seat takes a flat horizontal posture in a bed configuration, wherein the modules are arranged in a straight row and diagonally with respect to a direction in which the aircraft is flying.

However, in such an arrangement of the seat module, a certain width is required at the foot side of the seat, so that a dead space is created between a side wall portion of the seat module of the passenger arranged at a preceding row and a foot portion of the seat module of the passenger arranged at a following row, so that the efficiency of use of space is deteriorated.

Therefore, the present invention aims at providing an aircraft seat structure which adopts a configuration that ensures passenger comfort and allows effective use of the space inside the passenger cabin.

Solution to Problem

In order to achieve the above-described object, the aircraft seat structure according to the present invention comprises: a first seat unit having a first seat region that includes a first seat that can be changed between a seat configuration and a bed configuration, and a first protruding region that protrudes adjacent to the first seat region in a direction perpendicular to the longitudinal direction of the first seat region, which are surrounded by a plurality of partition walls; and a second seat unit having a second seat region that includes a second seat that can be changed between a seat configuration and a bed configuration, and a second protruding region that protrudes adjacent to the second seat region in a direction perpendicular to the longitudinal direction of the second seat region, which are surrounded by a plurality of partition walls, a third seat unit includes a third seat that can be changed between a seat configuration and a bed configuration, wherein the first protruding region of the first seat unit and the second protruding region of the second seat unit are formed so as to protrude in opposite directions relative to the first seat region and the second seat region, and the first seat unit is arranged in such a manner that a longitudinal direction thereof matches a front-rear direction of the aircraft, and the second seat unit is arranged in such a manner that a longitudinal direction thereof matches the front-rear direction of the aircraft, the first seat unit and the second seat unit being connected in a state where a portion of the second seat region of the second seat unit is inserted in the first protruding region of the first seat unit, the third seat unit is arranged to the second seat unit in a manner of side-by-side two rows, an intermediate portion is received in a space below the second seat portion or in an accommodating portion of the second protruding portion, at the second seat unit, and wherein the bed configuration is formed, by positioning the intermediate portion taken therefrom between the seat portion of the second seat of the second seat unit and a footrest portion arranged in an inner space of the first protruding portion of the first seat unit, heights of the top surfaces thereof being the same as each other, the second seat of the second seat unit and the third seat of the third seat unit are connected when a partition wall arranged between the second seat unit and the third seat unit is slid to open.

According to one typical example of the aircraft seat structure of the present invention, the protruding region of the first seat unit comprises an accommodating portion on a bottom face side, the seat region of the second seat unit comprises a protruding portion, and the first seat unit and the second seat unit are connected in a state where the protruding portion is inserted in the accommodating portion.

Moreover, the first seat unit and the second seat unit have doors provided on partition walls that are arranged on a same side with respect to the longitudinal direction.

In this configuration, the first seat unit or the second seat unit may comprise a slide portion provided on the partition wall arranged on an opposite side from the door.

Advantageous Effects of Invention

The present invention enables to ensure passenger comfort and allow effective use of the space within the passenger cabin.

DESCRIPTION OF EMBODIMENTS

Figure 1:
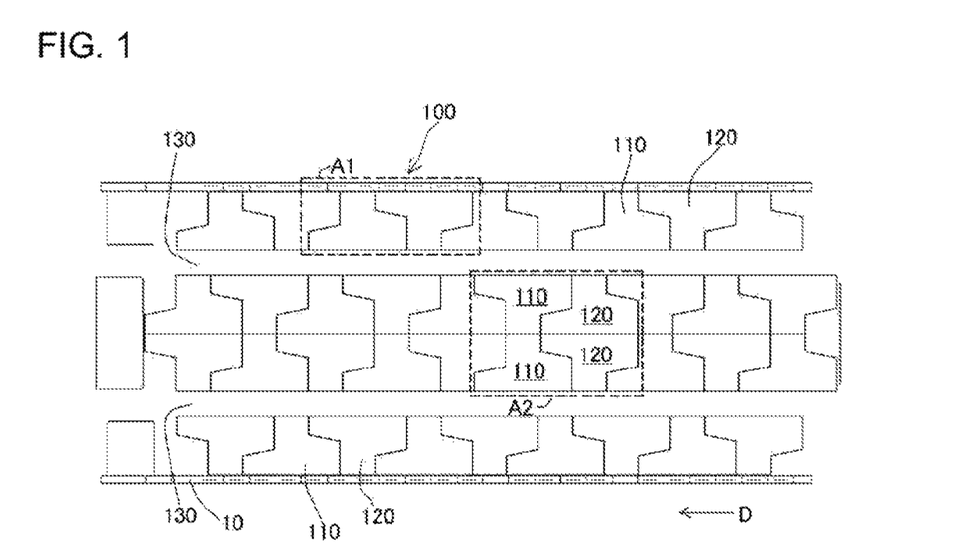
FIG. 1 is a partial upper view illustrating an example of layout in an aircraft passenger cabin adopting an aircraft seat structure according to one typical example of the present invention.

FIG. 1 is a partial upper view illustrating an example of layout in an aircraft passenger cabin adopting an aircraft seat structure according to one typical example of the present invention.

In FIG. 1, a left side of the drawing corresponds to a head side of the aircraft, and a right side of the drawing corresponds to a rear side of the aircraft.

As illustrated in FIG. 1, in an aircraft 10 adopting an aircraft seat structure according to the present invention, a plurality of aircraft seat structures 100 including a first seat unit 110 and a second seat unit 120 are arranged in a straight row along a direction matching a front-rear direction of the aircraft within the passenger cabin.

As an example of layout of the aircraft seat structure 100, one row of aircraft seat structures 100 is arranged directly on each of the wall sides, i.e., window sides, of the aircraft 10, and two rows of aircraft seat structures 100 are arranged at an intermediate area of the aircraft in straight rows so that opposing planes of side walls thereof are in contact with each other.

An aisle 130 is formed between the window-side row and the intermediate-area row of the aircraft seat structures 100.

Figure 2:
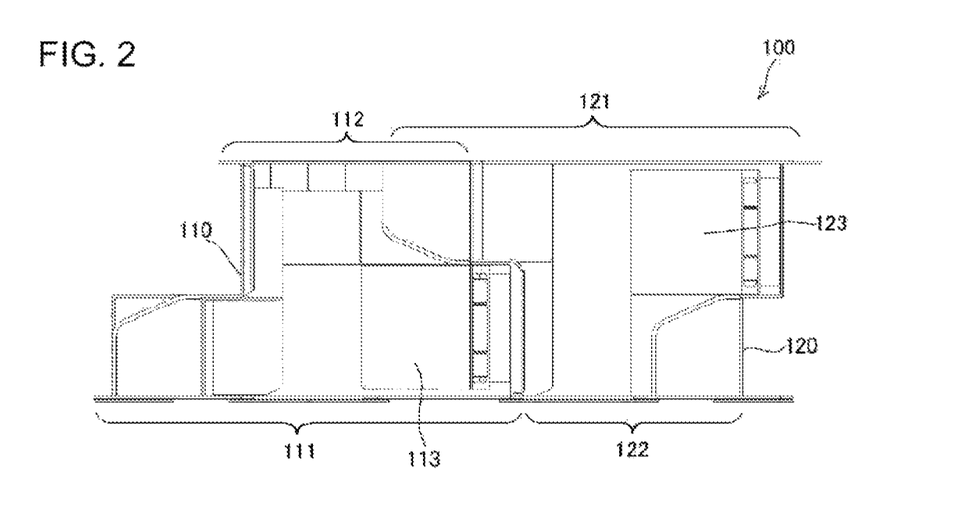
FIG. 2 is an upper view illustrating an outline of the aircraft seat structure applied to an area denoted by reference A1 of FIG. 1.

FIG. 2 is an upper view illustrating an outline of the aircraft seat structure applied to the area illustrated by reference A1 of FIG. 1.

As illustrated in FIG. 2, the aircraft seat structure 100 is configured such that the first seat unit 110 and the second seat unit 120 connected to a rear side of the first seat unit 110 constitute one unit.

The first seat unit 110 includes a seat region 111 having a seat 113 that can be changed between a seat configuration and a bed configuration, and a protruding region 112 that protrudes adjacent to the seat region 111 in a direction orthogonal to a longitudinal direction thereof.

Similarly, the second seat unit 120 includes a seat region 121 having a seat 123 that can be changed between a seat configuration and a bed configuration, and a protruding region 122 that protrudes adjacent to the seat region 121 in a direction orthogonal to a longitudinal direction thereof.

Then, as illustrated in FIG. 2, the protruding region 112 of the first seat unit 110 and the protruding region 122 of the second seat unit 120 protrude along opposite directions with respect to the respective seat regions (111 or 121).

In this state, it is preferable that the seat regions and the protruding regions of the first seat unit 110 and the second seat unit 120 are formed to have the same sizes.

Figure 3A:
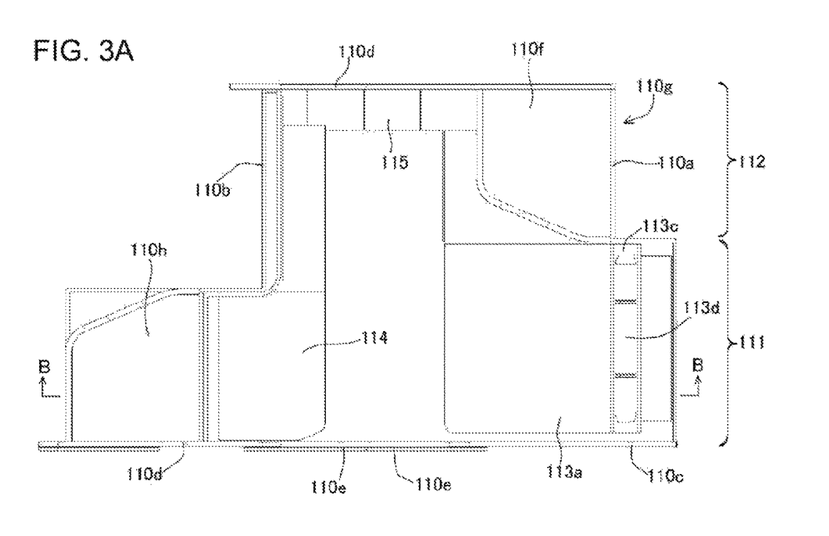
FIG. 3A is an upper view illustrating an outline of a first seat unit constituting a portion of the aircraft seat structure illustrated in FIG. 2.
Figure 3B:
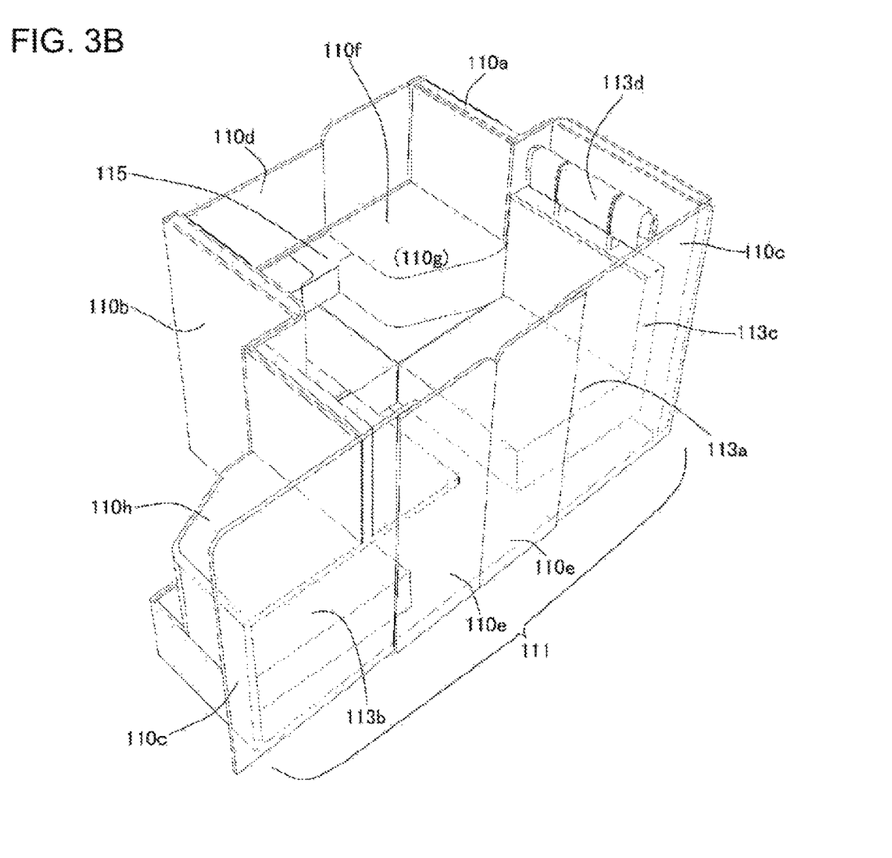
FIG. 3B is a perspective view illustrating an outline of the first seat unit constituting a portion of the aircraft seat structure illustrated in FIG. 2.

FIG. 3 is a view illustrating an outline of the first seat unit constituting a portion of the aircraft seat structure illustrated in FIG. 2, wherein FIG. 3A is an upper view and FIG. 3B is a perspective view thereof.

The first seat unit 110 adopts a configuration in which an outer circumference of the seat region 111 and the protruding region 112 including the seat 113 illustrated in FIG. 2 are surrounded by a plurality of partition walls 110a through 110d.

Figure 5:
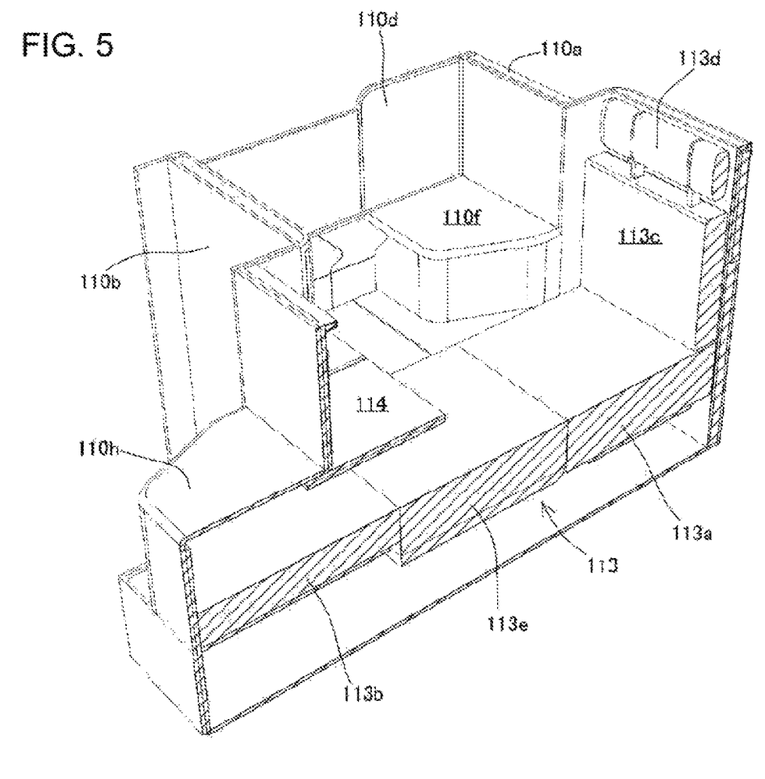
FIG. 5 is a schematic view illustrating one example of a seat in a bed configuration of the aircraft seat structure according to the present invention, which is a perspective view of B-B cross-section of FIG. 3A.

The seat 113 arranged in an inner side of the seat region 111 includes, as illustrated in FIG. 3B, a seat portion 113a, a footrest portion 113b arranged in a separated manner from the seat portion 113a, a backrest portion 113c connected to the seat portion 113a, a headrest 113d attached to an upper end of the backrest portion 113c, and an intermediate portion arranged between the seat portion 113a and the footrest portion 113b in the bed configuration (refer to reference number 113e of FIG. 5).

The seat 113 configured in this manner is capable of changing configurations between a seat configuration illustrated in FIG. 3B and a bed configuration described later (refer to FIG. 5).

The plurality of partition walls surrounding the seat region 111 and the protruding region 112 are composed of a first partition wall 110a arranged on the side of the backrest portion 113c of the seat region 111, a second partition wall 110b arranged on the side of the footrest portion 113b opposed to the first partition wall 110a, a third partition wall 110c that connects the first partition wall 110a and the second partition wall 110b at a side face of the seat region 111, and a fourth partition wall 110d that connects the first partition wall 110a and the second partition wall 110b at a side face of the protruding region 112.

Further, a sliding door 110e is attached to an intermediate portion of the third partition wall 110c.

These partition walls 110a through 110d allow the first seat unit 110 to form an internal space that can be used as a private room by the passenger.

In the protruding region 112, a flat surface portion 110f is formed at a portion positioned close to the connected portion between the first partition wall 110a and the fourth partition wall 110d, and an accommodating portion 110g that accommodates a protruding portion of the second seat unit 120 (refer to FIG. 4) described later is formed on a floor side of the flat surface portion 110f.

As illustrated in FIG. 3B, the flat surface portion 110f is arranged adjacent to the seat portion 113a of the seat 113, so that an upper surface thereof may be used as a side table.

Meanwhile, in the seat region 111, a protruding portion 110h is formed at a portion where the footrest portion 113b is protruded outward from the second partition wall 110b.

Further, a main table 114 and a sub-table 115 are respectively attached, as interior equipment, to the second partition wall 110b and the fourth partition wall 110d.

Figure 4A:
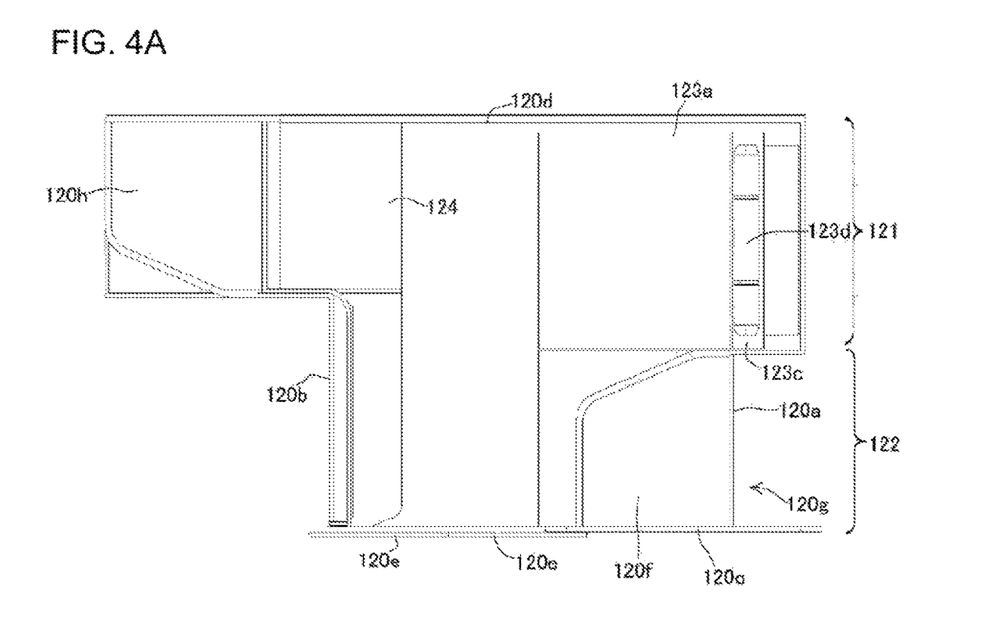
FIG. 4A is an upper view illustrating an outline of a second seat unit constituting a portion of the aircraft seat structure illustrated in FIG. 2.
Figure 4B:
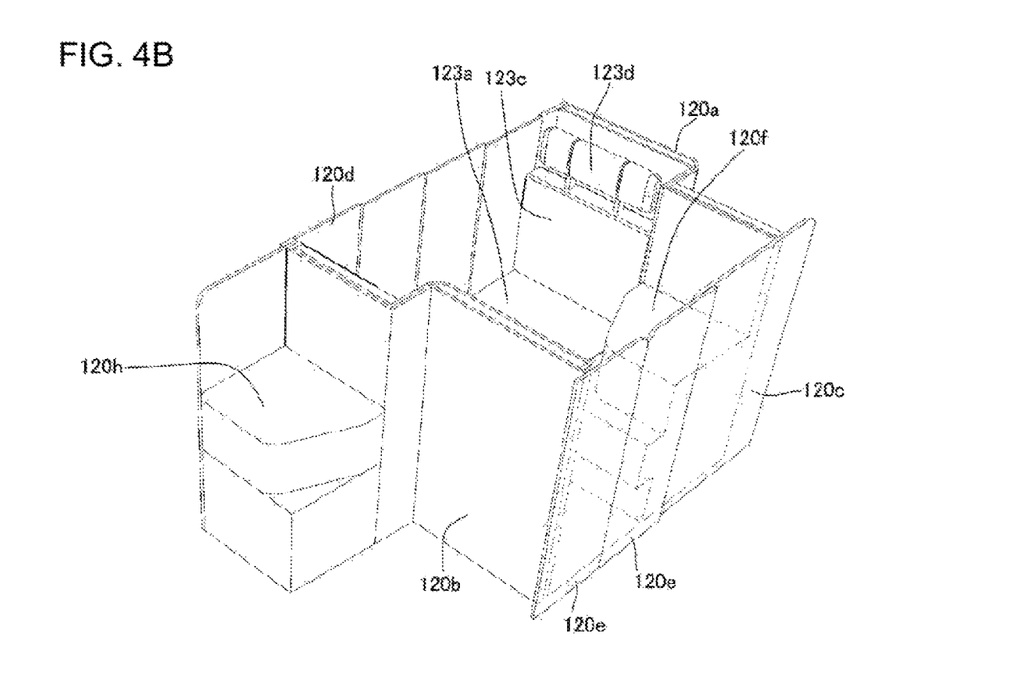
FIG. 4B is a perspective view illustrating an outline of the second seat unit constituting a portion of the aircraft seat structure illustrated in FIG. 2.

FIG. 4 is a view illustrating an outline of a second seat unit constituting a portion of the aircraft seat structure illustrated in FIG. 2, wherein FIG. 4A is an upper view and FIG. 4B is a perspective view thereof.

The second seat unit 120 adopts a configuration in which an outer circumference of the seat region 121 and the protruding region 122 including the seat 123 illustrated in FIG. 2 are surrounded by the plurality of partition walls 120a through 120d.

The seat 123 arranged in the inner side of the seat region 121 includes, as illustrated in FIG. 4B, a seat portion 123a, a footrest portion 123b arranged in a separated manner from the seat portion 123a, a backrest portion 123c connected to the seat portion 123a, a headrest 123d attached to an upper end of the backrest portion 123c, and an intermediate portion (not shown) arranged between the seat portion 123a and the footrest portion 123b in the bed configuration.

The seat 123 configured in this manner is capable of changing configurations between a seat configuration illustrated in FIG. 4B and a bed configuration, similar to the first seat unit 110.

The plurality of partition walls surrounding the seat region 121 and the protruding region 122 are composed of a first partition wall 120a arranged on the side of the backrest portion 123c of the seat region 121, a second partition wall 120b arranged on the side of the footrest portion 123b opposed to the first partition wall 120a, a third partition wall 120c that connects the first partition wall 120a and the second partition wall 120b at a side face of the protruding region 122, and a fourth partition wall 120d connecting the first partition wall 120a and the second partition wall 120b at a side face of the sheet region 121.

Further, a sliding door 120e is attached to an intermediate portion of the third partition wall 120c.

These partition walls 120a through 120d allow the second seat unit 120 to form an internal space that can be used as a private room by the passenger, similar to the first seat unit 110.

In the protruding region 122, a flat surface portion 120f is formed at a portion positioned close to the connected portion between the first partition wall 120a and the third partition wall 120c, and an accommodating portion 120g is formed on a floor side of the flat surface portion 120f, similar to the first sheet unit 110.

As illustrated in FIG. 4B, the flat surface portion 120f is arranged adjacent to the seat portion 123a of the seat 123, so that an upper surface thereof may be used as a side table.

Meanwhile, in the seat region 121, a protruding portion 120h is formed at a portion where the footrest portion 123b is protruded outward from the second partition wall 120b, and the protruding portion 120h is accommodated in an accommodating portion 110g of the first sheet unit 110 described above.

Further, a main table 124 is attached, as interior equipment, to the second partition wall 120b and the fourth partition wall 120d.

FIG. 5 is a schematic view illustrating one example of a bed configuration of the seat provided in the aircraft seat structure according to the present invention, which illustrates a perspective view of a B-B cross-section of FIG. 3A.

In FIG. 5, the first seat unit 110 is illustrated as an example, but the configurations and functions are similar in the second seat unit 120.

As illustrated in FIG. 5, in a seat configuration of the seat 113, an intermediate portion 113e is arranged between the seat portion 113a and the footrest portion 113b.

Thereby, the upper surfaces of the seat portion 113a, the footrest portion 113b and the intermediate portion 113e are arranged at the same height, allowing the seat 113 to be used as a bed by the passenger.

Now, as an example, in the seat configuration, the intermediate portion 113e is accommodated in the internal space of the first seat unit 110 such as the space below the seat portion 113a or an accommodating portion (not shown) of the protruding region 112, and in the bed configuration, it is taken out and arranged in place.

Figure 6:
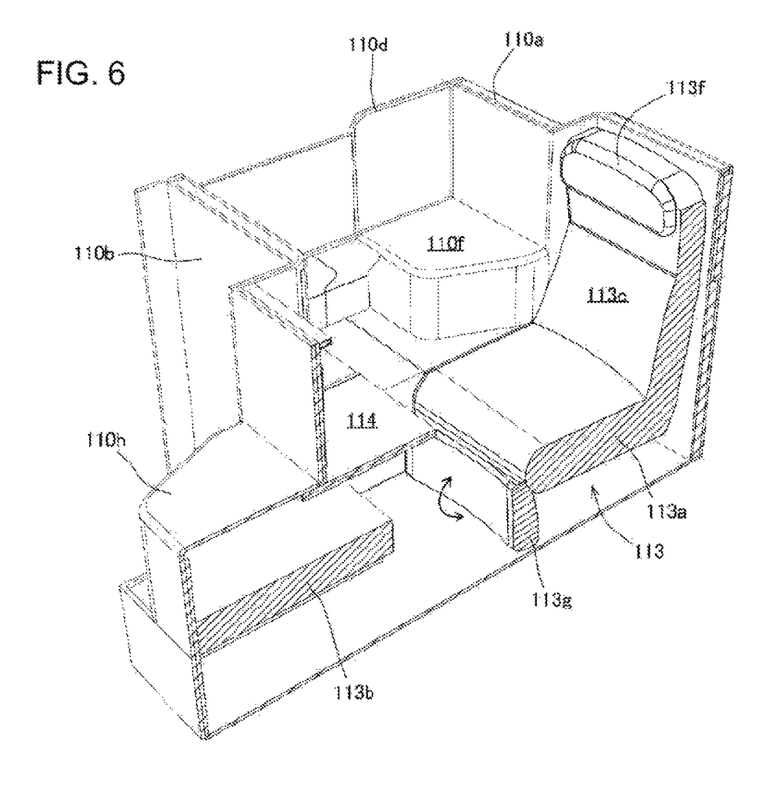
FIG. 6 is a schematic view illustrating a modified example of a bed configuration of the aircraft seat structure according to the present invention, which is a perspective view of B-B cross-section of FIG. 3A.

FIG. 6 is a schematic view illustrating a modified example of a bed configuration of the aircraft seat structure according to the present invention, in which a perspective view of B-B cross-section of FIG. 3A is illustrated.

FIG. 6 illustrates the first seat unit 110, but the configurations and functions of the second seat unit 120 are the same.

As illustrated in FIG. 6, a folding portion 113g which is folded and accommodated in the seat configuration is attached to the seat portion 113a of the seat 113, and in the bed configuration, the folding portion 113g is expanded into a flat configuration.

Thereby, the upper surfaces of the seat portion 113a, the footrest portion 113b and the folding portion 113g are arranged at the same height, allowing the seat 113 to be used as a bed by the passenger.

Figure 7A:
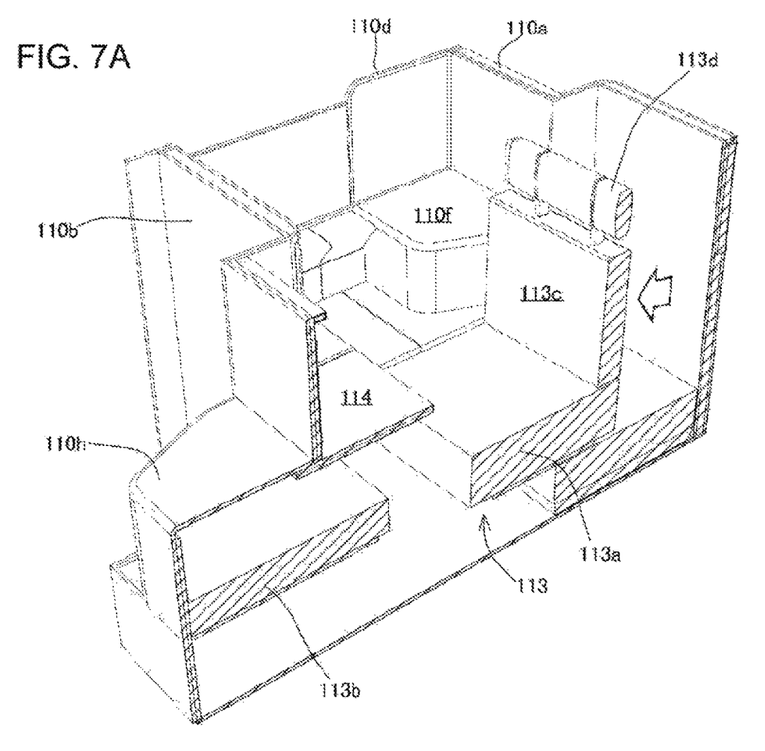
FIG. 7A is a perspective view illustrating a first step according to one example of reclining operation of a seat provided in the aircraft seat structure according to the present invention.
Figure 7B:
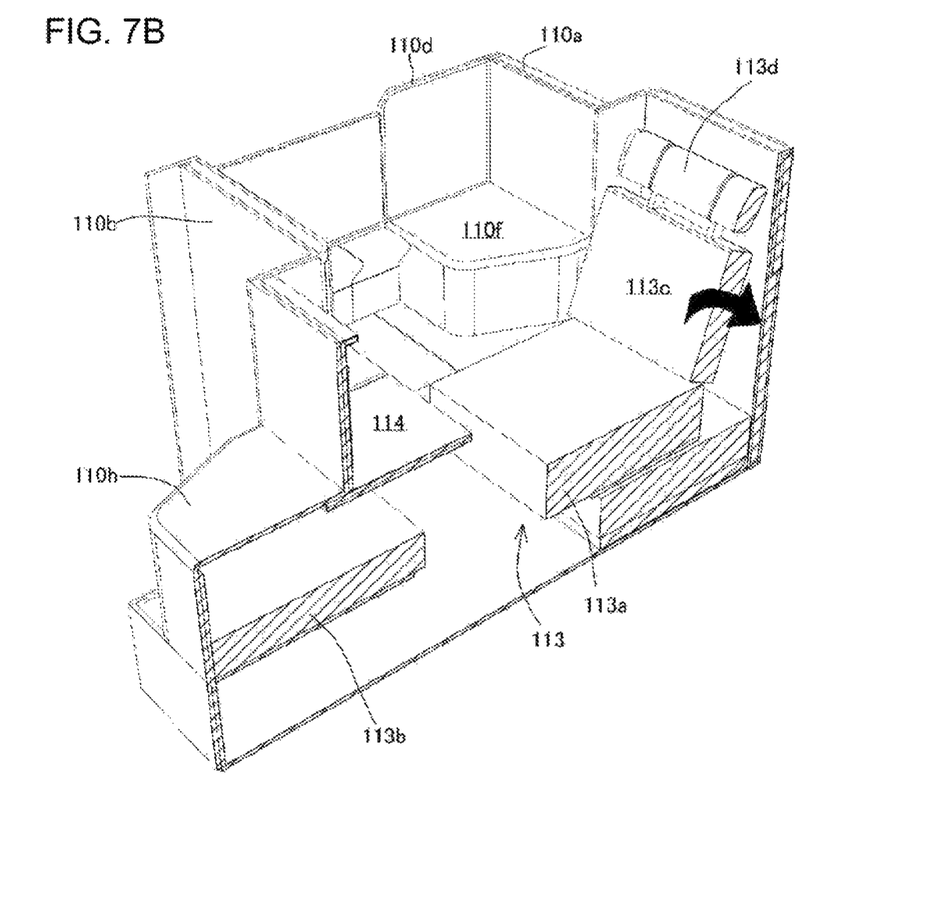
FIG. 7B is a perspective view illustrating a second step according to one example of the reclining operation of the seat provided in the aircraft seat structure according to the present invention.

FIG. 7 is a perspective view of B-B cross-section of FIG. 3A illustrating one example of reclining operation of the seat included in the aircraft seat structure according to the present invention, wherein FIG. 7A illustrates a first step and FIG. 7B illustrates a second step.

In order to recline the seat 113, as illustrated in FIG. 7A, the seat portion 113a is slid forward (first step).

In this state, the seat portion 113a and the backrest portion 113c are slid in an integrated manner, and a space is formed behind the backrest portion 113c.

Next, as illustrated in FIG. 7B, the seat 113 takes a reclining position by tilting the backrest portion 113c with respect to the seat portion 113a within the above-described space (second step).

The angle of tilt of the backrest portion 113c may be changed in steps or may be designed so that arbitrary angles can be set successively.

By adopting this configuration, the aircraft seat structure according to the present invention has the seat region ensuring passenger comfort, because the seat for each passenger is surrounded by the plurality of partition walls, so an internal space thereof can be used as a simulative private room.

Further, the first seat unit and the second seat unit are connected in a state where the protruding portion corresponding to the footrest portion in the seat region of the second seat unit is accommodated in the accommodating portion formed on the first seat unit, so that gaps that may be formed between the connected seat units can be eliminated, and as a result, the space inside the passenger cabin can be used effectively.

Figure 8A:
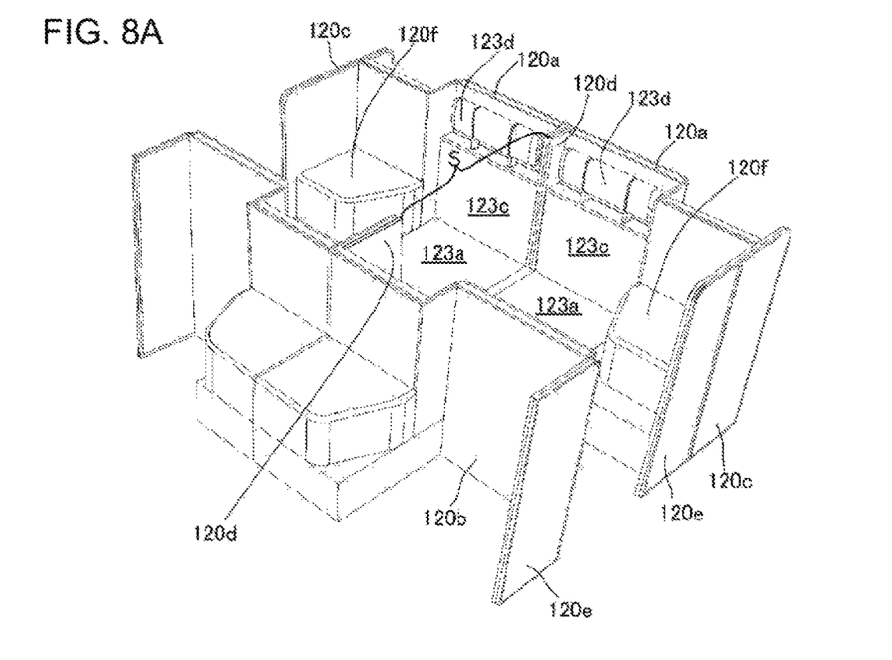
FIG. 8A is a partial perspective view of a schematic view illustrating a modified example of the aircraft seat structure according to the present invention.
Figure 8B:
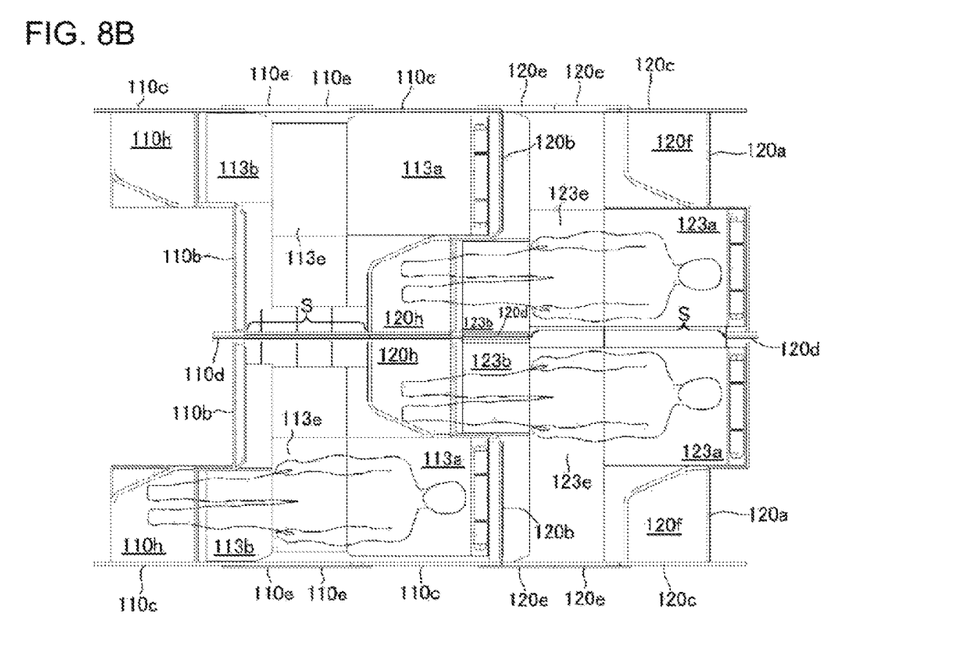
FIG. 8B is a schematic view illustrating a modified example of the aircraft seat structure according to the present invention, illustrating an upper view in a bed configuration.

FIG. 8 is a schematic view illustrating a modified example of the aircraft seat structure according to the present invention, wherein FIG. 8A is a partial perspective view, and FIG. 8B is an upper surface view of a bed configuration.

The modified example of the seat structure illustrated in FIG. 8 illustrates an example of a case where the seat structure is applied to the region denoted by reference A2 of FIG. 1, wherein the common configurations as the example illustrated in FIGS. 2 through 7 are denoted with the same reference numbers, and descriptions thereof are omitted.

As illustrated in FIG. 1, the aircraft seat structure 100 according to the present invention is configured are so that two rows of seat structures aligned in a straight line adjacent to one another near a center in a width direction of the passenger cabin in the aircraft, for example.

According to the modified example illustrated in FIG. 8, a movable slide portion S is formed on a fourth partition wall 120d (that is, the partition wall opposed to a third partition wall 120c on which a door 120e is formed) of the second seat unit 120 to which the seat region is adjacent in the drawing.

In this state, as illustrated in FIG. 8A, since the slide portion S of the fourth partition wall 120d is set to be opened to a same height as the seat portion 123a of the seat 123, the seats 123 of second seat units 120 of two adjacent aircraft seat structures 100 are connected to realize a so-called "double bed" configuration.

Thereby, as illustrated in FIG. 8B, two adjacent "internal spaces" can be used as a continuous state, so that the connected space similar to a single room can be provided for use by a couple of passengers such as family members.

An arbitrary mechanism can be adopted for sliding the slide portion S, such as a mechanism for moving the slide portion S up and down to the height of the seat portion 123a or a mechanism for moving the slide portion S sideways along the fourth partition wall 120d.

According to another modified example, a movable slide portion S is formed on the fourth partition walls 110d (that is, the partition walls that oppose to the third partition walls 110c on which a door 110e is formed) of the first seat unit 110 whose protruding regions are arranged adjacent to each other in the drawing of FIG. 8B.

Thereby, two adjacent "internal spaces" can be used in a manner sharing the connected space of the protruding regions, by which a space can be provided where the privacy of a private room is maintained while connecting two adjacent seats for use.

The configuration of the aircraft seat structure according to one typical example of the present invention has been illustrated, but the aircraft seat structure according to the present invention is not restricted to the actual examples illustrated above, and various modifications are possible.

For example, in the above-described embodiment, a door has been formed on the third partition wall in the first and second seat units, but it is also possible to form a door on the fourth partition wall opposed to the third partition wall and to arrange isles on both sides of the unit.

According further to the modified example illustrated in FIG. 8, a configuration having an opening region that reaches a floor surface can be adopted to enable passengers to move between two adjacent seat units.

Other various modifications are also possible without departing from the scope of the present invention.

REFERENCE SIGNS LIST 10 aircraft
100 aircraft seat structure
110 first seat unit
120 second seat unit
110a, 120a first partition wall
110b, 120b second partition wall
110c, 120c third partition wall
110d, 120d fourth partition wall
110e, 120e door
110f, 120f flat surface portion
110g, 120g accommodating portion
110h, 120h protruding portion
111, 121 seat region
112, 122 protruding region
113, 123 seat
113a, 123a seat portion
113b, 123b footrest portion
113c, 123c backrest portion
113d, 123d headrest
113e, 123e intermediate portion
114, 124 main table
115 sub-table
S slide portion

The invention claimed is:

1. An aircraft seat structure comprising:
a first seat unit having a first seat region that includes a first seat that can be changed between a seat configuration and a bed configuration, and a first protruding region that protrudes adjacent to the first seat region in a direction perpendicular to the longitudinal direction of the first seat region, which are surrounded by a plurality of partition walls; and
a second seat unit having a second seat region that includes a second seat that can be changed between a seat configuration and a bed configuration, and a second protruding region that protrudes adjacent to the second seat region in a direction perpendicular to the longitudinal direction of the second seat region, which are surrounded by a plurality of partition walls,
a third seat unit includes a third seat that can be changed between a seat configuration and a bed configuration,
wherein the first protruding region of the first seat unit and the second protruding region of the second seat unit are formed so as to protrude in opposite directions relative to the first seat region and the second seat region, and
the first seat unit is arranged in such a manner that a longitudinal direction thereof matches a front-rear direction of the aircraft, and the second seat unit is arranged in such a manner that a longitudinal direction thereof matches the front-rear direction of the aircraft, the first seat unit and the second seat unit being connected in a state where a portion of the second seat region of the second seat unit is inserted in the first protruding region of the first seat unit,
the third seat unit is arranged to the second seat unit in a manner of side-by-side two rows, an intermediate portion is received in a space below the second seat portion or in an accommodating portion of the second protruding portion, at the second seat unit, and wherein the bed configuration is formed, by positioning the intermediate portion taken therefrom between the seat portion of the second seat of the second seat unit and a footrest portion arranged in an inner space of the first protruding portion of the first seat unit, heights of the top surfaces thereof being the same as each other, the second seat of the second seat unit and the third seat of the third seat unit are connected when a partition wall arranged between the second seat unit and the third seat unit is slid to open.

2. The aircraft seat structure according to claim 1, wherein the first protruding region of the first seat unit comprises an accommodating portion on a bottom face side, the second seat region of the second seat unit comprises a protruding portion, and the first seat unit and the second seat unit are connected in a state where the protruding portion is inserted in the accommodating portion.

3. The aircraft seat structure according to claim 2, wherein the first seat unit and the second seat unit have doors provided on partition walls that are arranged on a same side with respect to the longitudinal direction.

4. The aircraft seat structure according to claim 3, wherein the second seat unit comprises a slide portion provided on the partition wall arranged on an opposite side from the door.

5. The aircraft seat structure according to claim 3, wherein the first seat unit comprises a slide portion provided on the partition wall arranged on an opposite side from the door.

6. The aircraft seat structure according to claim 5, wherein the second seat unit comprises a slide portion provided on the partition wall arranged on an opposite side from the door.

7. The aircraft seat structure according to claim 1, wherein the first seat unit and the second seat unit have doors provided on partition walls that are arranged on a same side with respect to the longitudinal direction.

8. The aircraft seat structure according to claim 7, wherein the second seat unit comprises a slide portion provided on the partition wall arranged on an opposite side from the door.

9. The aircraft seat structure according to claim 7, wherein the first seat unit comprises a slide portion provided on the partition wall arranged on an opposite side from the door.

10. The aircraft seat structure according to claim 9, wherein the second seat unit comprises a slide portion provided on the partition wall arranged on an opposite side from the door.

* * * * *